United States Patent
Zhu et al.

(10) Patent No.: US 6,584,465 B1
(45) Date of Patent: Jun. 24, 2003

(54) METHOD AND SYSTEM FOR SEARCH AND RETRIEVAL OF SIMILAR PATTERNS

(75) Inventors: Wei Zhu, Rochester, NY (US); Rajiv Mehrotra, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/513,405

(22) Filed: Feb. 25, 2000

(51) Int. Cl.[7] .............................................. G06F 17/30
(52) U.S. Cl. .............................. 707/6; 707/10; 707/100
(58) Field of Search .............................. 707/1–7, 9, 10, 707/100–104.1, 200, 201, 203; 709/200, 201, 217–219; 345/418, 419, 423; 382/111, 181, 190, 191, 192, 193, 195, 199, 203, 209, 276, 305

(56) References Cited

U.S. PATENT DOCUMENTS

| | | | |
|---|---|---|---|
| 5,144,688 A | * 9/1992 | Bovir et al. | 382/166 |
| 5,463,480 A | * 10/1995 | MacDonald et al. | 358/520 |
| 5,481,601 A | * 1/1996 | Nazif et al. | 379/201.03 |
| 5,495,568 A | 2/1996 | Beavin | 364/188 |
| 5,553,957 A | * 9/1996 | Dornbusch et al. | 401/209 |
| 5,561,720 A | * 10/1996 | Lellmann et al. | 382/178 |
| 5,579,471 A | 11/1996 | Barber et al. | 345/326 |
| 5,751,829 A | 5/1998 | Ringland et al. | 382/100 |
| 5,768,481 A | * 6/1998 | Chan et al. | 358/1.2 |
| 5,779,146 A | * 7/1998 | Cutler | 239/289 |
| 5,845,143 A | * 12/1998 | Yamauchi et al. | 704/2 |
| 5,852,823 A | 12/1998 | De Bonet | 707/6 |
| 5,893,095 A | 4/1999 | Jain et al. | 707/6 |
| 5,949,904 A | 9/1999 | Delp | 382/165 |
| 5,977,890 A | * 11/1999 | Rigoutsos et al. | 341/55 |
| 5,995,115 A | 11/1999 | Dickie | 345/441 |
| 6,041,053 A | * 3/2000 | Douceur et al. | 370/389 |
| 6,075,540 A | 6/2000 | Hoppe | 345/419 |
| 6,115,040 A | * 9/2000 | Bladow et al. | 345/741 |
| 6,128,613 A | * 10/2000 | Wong et al. | 707/5 |
| 6,145,120 A | * 11/2000 | Highland | 703/23 |
| 6,173,278 B1 | * 1/2001 | Rothschild | 707/1 |
| 6,192,150 B1 | * 2/2001 | Leow et al. | 382/181 |
| 6,283,053 B1 | * 9/2001 | Morgante et al. | 112/80.73 |
| 6,298,151 B1 | * 10/2001 | Jodoin et al. | 358/462 |
| 6,304,333 B1 | * 10/2001 | Shaked et al. | 358/1.1 |
| 6,356,658 B1 | * 3/2002 | Sezan et al. | 382/209 |
| 6,377,945 B1 | * 4/2002 | Risvik | 370/235 |
| 6,411,953 B1 | * 6/2002 | Ganapathy et al. | 707/6 |

FOREIGN PATENT DOCUMENTS

WO    WO 99/34319    7/1999    ............ G06K/9/00

OTHER PUBLICATIONS

On Retrieving Textured Images from an Image Database: by Georgy L. Gimel'Farb and Anil K. Jain. Pattern Recognition, vol. 29, No. 9, pp. 1461–1483, 1996.

"Periodicity, Directionality, and Randomness: Wold Features for Image Modeling and Retrieval" by Fang Liu and Rosalind W. Picard. IEEE Transactions on Pattern Analysis and Machine Intelligence. vol. 18, No. 7, Jul. 1996.

"A Texture Descriptor for Image Retrieval and Browsing" by P. Wu, B.S. Manjunanth, S.D. Newsam, and H.D. Shin. 1999 IEEE, pp. 3–7.

* cited by examiner

Primary Examiner—Greta Robinson
Assistant Examiner—Harold E. Dodds, Jr.
(74) Attorney, Agent, or Firm—David M. Woods

(57) ABSTRACT

A method for retrieving digital patterns similar to a query pattern operates by generating representations of each digital pattern in terms of one or more color invariant properties; storing and organizing the patterns and their representations in a database; and searching the database by reference to the representations to identify and retrieve patterns similar to the query pattern. A preferred color invariant property is an edge property of the digital patterns. A web-based pattern registration and searching architecture enables on-line pattern search and selection utilizing a variety of pattern representations and similarity techniques, including the edge property based system described above.

25 Claims, 6 Drawing Sheets

METHOD AND SYSTEM FOR SEARCH AND RETRIEVAL OF SIMILAR PATTERNS

FIELD OF THE INVENTION

The invention relates generally to the field of pattern recognition, and in particular to the retrieval of patterns from a database.

BACKGROUND OF THE INVENTION

Patterns are central to the design of fabrics, textiles, wallpapers, floor mats, tiles, etc. A pattern is composed of various pattern elements. A common approach to generating different versions of a pattern is to vary the color of one or more pattern elements. For example, several versions of a ½" vertical stripe pattern can be created by using different combinations of two or more colors. The differently colored versions of a pattern are considered perceptually similar in connection with numerous applications. For example, it is common for a fabric designer or manufacturer to offer its customer a large selection of colored patterns, where the entire set is composed of perceptually similar patterns which vary only on the basis of color. The same is true for other colored pattern-based items. A furniture store offers its customer a choice of similar fabric patterns for furniture. An interior decorator or home manufacturer can offer a selection of similar patterns for wallpaper, tiles, etc.

In recent years, several commercial software and web-based services have been introduced in areas like interior decoration and made to order furniture or clothing, where a customer is required to select a pattern for one or more items. For example, a customer can create virtual 3-dimensional furniture with the desired fabric(s) in a selected pattern or create and decorate a virtual 3-dimensional room with selected furniture(s), wallpaper(s), flooring(s), etc. A virtual item can be created with different patterns or different versions of a selected pattern in order to make a final selection for custom ordering. In these situations, a customer or user commonly wants to view one or more versions of a selected pattern in order to make the final selection. For example, a decision on wallpaper may require a customer to view one or more of different available versions of a desired pattern. In these and similar applications, a person making a final decision on the pattern of an item generally employs a two step process for the selection of a specific pattern. First, a desired pattern is selected or provided. Then a version of the selected or provided pattern is selected. The second step of the selection process, that is, the selection of a specific version of a selected or provided pattern, requires a decision-maker to view different versions of the selected or provided pattern.

Current software or web-based systems and applications generally employ one of the following two approaches for identifying patterns that are perceptually similar to a given pattern:

(a) predefined groups of perceptually similar patterns are stored in the system, with each pattern including a reference to the parent group with which it is also associated. Given a pattern, the referenced group provides the perceptually similar patterns;

(b) a user is required to review an entire database to identify different versions of the selected or provided pattern.

Both these approaches have several shortcomings. For a sizable pattern database, the second approach can be very taxing and frustrating for a user. The first approach is very taxing for the system and/or pattern designer who define(s) the groups of perceptually similar patterns. Mistakes made in defining the groups could lead to unexpected results and customer dissatisfaction. Furthermore, the addition and/or deletion of new patterns requires modification of the pattern groups, which may prove to be commercially uneconomical and/or impractical.

Therefore, automatic, feature similarity based pattern search and retrieval systems are needed for identifying perceptually similar patterns. However, none of the existing feature similarity based search and retrieval techniques are well suited for automatic pattern similarity-based search and retrieval. In U.S. Pat. Nos. 5,579,471; 5,852,823 and 5,893,095, search and retrieval techniques are based on color feature similarity. In a system for selecting decorative materials described in U.S. Pat. No. 5,751,829, spectrophotometric color referencing allows data records to be searched on the basis of color, as well as other information that was entered into the record. Wallpaper patterns, drapery material, floor covering or paint can then be selected on the basis of matching color. Various patterns and paints can be compared side-by-side and rendered onto a room image so that the consumer can view an accurate simulation of the chosen materials. However, color feature similarity-based methods described in these patents are not suited because they identify similar images based on the similarity of color contents or color properties. Since color properties of different versions of the same patterns usually vary, color similarity cannot be employed to identify and retrieve similar patterns. Texture feature based methods disclosed in the first three patents are not suited because they determine image similarity in terms of monochromatic textural properties of patterns. Since several different colors reduce to the same monochromatic value, the patterns in the monochromatic versions of two different color versions of the same pattern can differ and hence would not be considered similar.

What is needed, since color and texture properties of different versions of the same patterns usually vary, is a system that can be employed to identify and retrieve similar patterns irrespective of color variations.

SUMMARY OF THE INVENTION

It is an object of the invention to provide a system and a method for automatic search and retrieval of patterns similar to a given pattern.

Assuming that each colored pattern is available as a digital image, it is a further object of the invention to provide for automatic search and retrieval of digital images that are computer generated synthetic images of patterns or digital images of full patterns from the actual items (i.e., fabric, tile, or wallpaper).

The present invention is directed to overcoming one or more of the problems set forth above. Briefly summarized, according to one aspect of the present invention, the invention includes a method for retrieving digital patterns similar to a query pattern by generating representations of each digital pattern in terms of one or more color invariant properties; storing and organizing the patterns and their representations in a database; and searching the database by reference to the representations to identify and retrieve patterns similar to the query pattern. A preferred color invariant property is an edge property of each digital pattern, and more particularly its edge orientation.

The advantage of this invention is that it provides a system for organizing a database of patterns by color invariant properties, such as an edge property. Patterns and colors are crucial to the design of wallpapers, fabrics, textiles, floor mats, tile, rugs, etc. These items are usually available in different colored versions of the same pattern. In other words, different versions of the same pattern are created using different colors for the pattern elements. What this means is that different colored versions of a pattern are considered to be similar patterns. In applications such as fabric selection for furniture or clothing, wallpapers, floor mats, rugs, window treatments, and tile selection in an interior decoration application, different colored versions of a selected pattern are usually reviewed. Such a review requires identification and retrieval of the set of patterns similar to a selected pattern, and at least initially irrespective of color.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because image processing systems employing search and retrieval strategies are well known, the present description will be directed in particular to attributes forming part of, or cooperating more directly with, apparatus in accordance with the present invention. System attributes not specifically shown or described herein may be selected from those known in the art. In the following description, a preferred embodiment of the present invention would ordinarily be implemented as a software program, although those skilled in the art will readily recognize that the equivalent of such software may also be constructed in hardware. Given the system and methodology as described in the following materials, all such software implementation needed for practice of the invention is conventional and within the ordinary skill in such arts. If the invention is implemented as a computer program, the program may be stored in conventional computer readable storage medium, which may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

The subject matter of the present invention relates to digital image understanding technology, which is understood to mean technology that digitally processes a digital image to recognize and thereby assign useful meaning to human understandable objects, attributes or conditions and then to utilize the results obtained in the further processing of the digital image.

Figure 1:
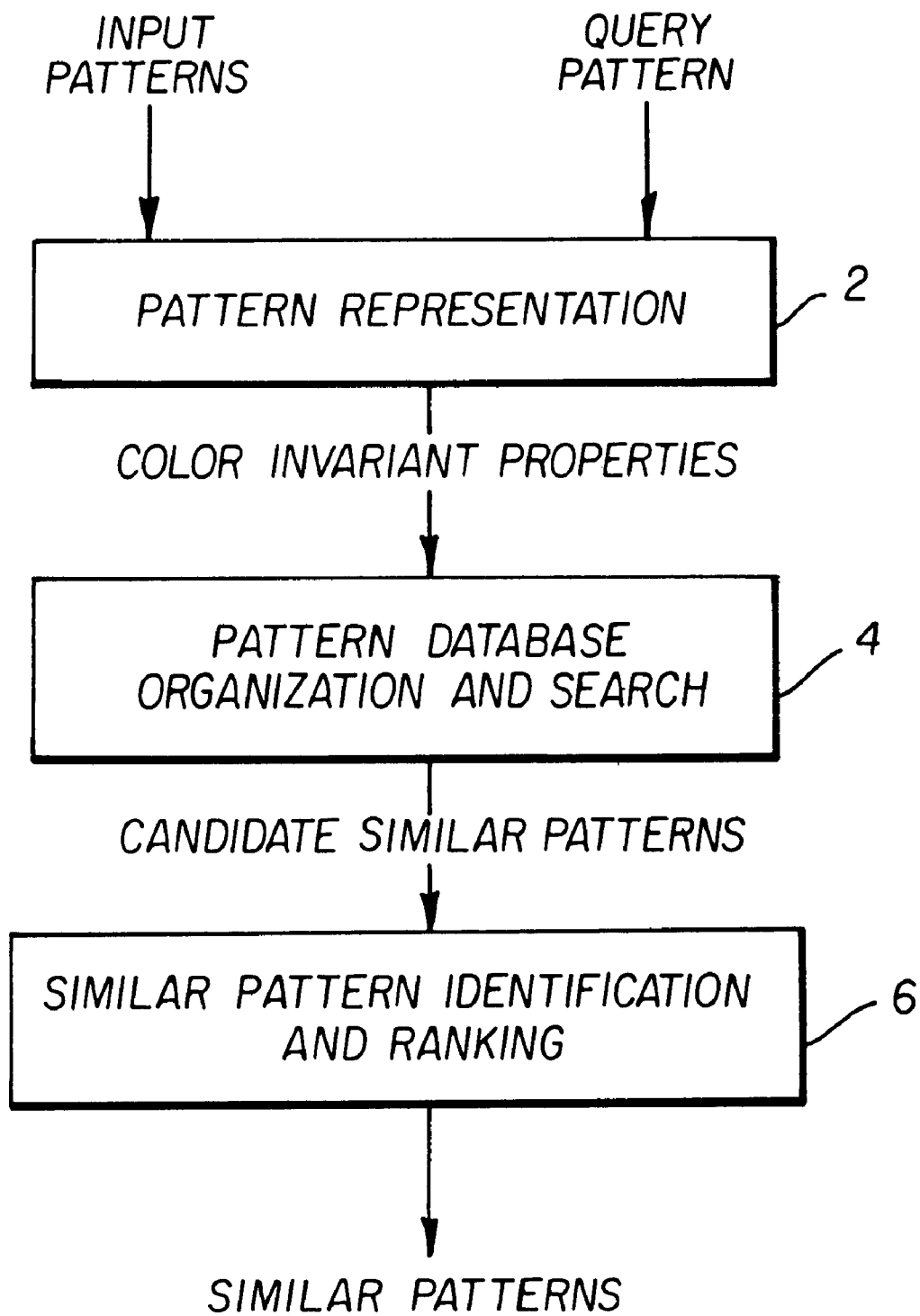
FIG. 1 is a block diagram of the functional components of the invention.

The system and method developed according to this invention is composed of three key functional components, as shown in FIG. 1:

(a) A pattern representation component 2, where each digital pattern is represented by a set of its properties that are invariant to color changes.

(b) A pattern database organization and search component 4, in which the database of patterns and their representations is organized so that it can be efficiently searched for patterns that are potentially similar to a selected or query pattern. These potentially similar patterns are considered candidate similar patterns.

(c) A similar pattern identification and ranking component 6, in which each pattern in the set of candidate similar patterns is processed to determine its similarity with the query pattern. Candidates with similarity value less than a specified threshold are discarded and the remaining candidates are ranked in the descending order of their similarity with the query pattern.

Figures 2A, 2B:
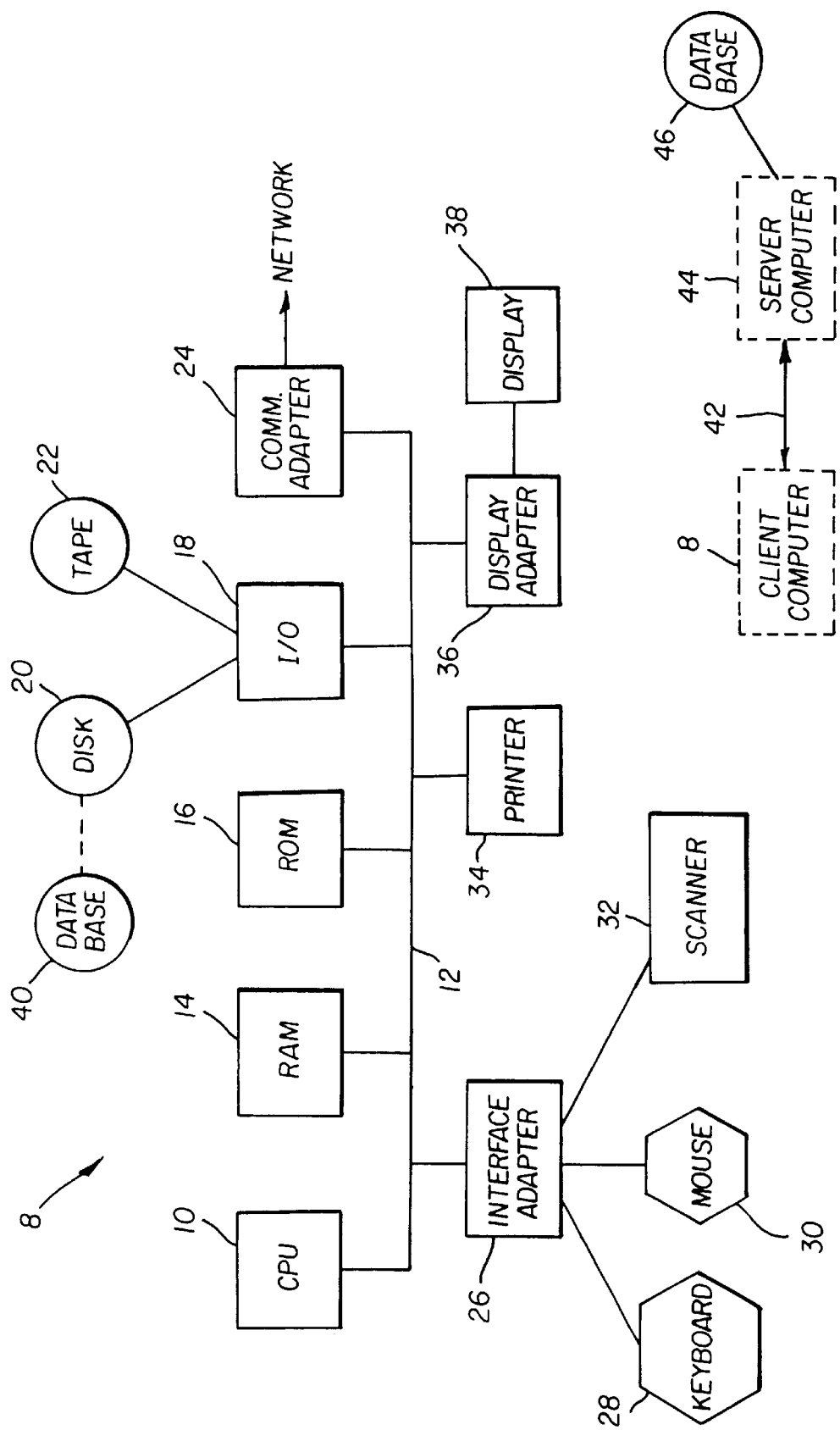
FIG. 2A is a block diagram of a computer system for implementing the invention.
FIG. 2B is a block diagram of a client—server model useful in understanding a web-based implementation of the invention.

While the overall methodology of the invention is described herein, the invention can be embodied in any number of different types of systems and executed in any number of different ways, as would be known by one ordinarily skilled in the art. For example, as illustrated in FIG. 2A, a typical hardware configuration of an information handling/computer system 8 in accordance with the invention preferably has at least one processor or central processing unit (CPU) 10. The CPU 10 is interconnected via a system bus 12 to a random access memory (RAM) 14, a read-only memory (ROM) 16, an input/output (I/O) adapter 18 (for connecting peripheral devices such as disk units 20 and tape drives 22 to the bus 12), a communication adapter 24 (for connecting an information handling system to a data processing network), a user interface adapter 26 (for connecting peripherals 28, 30, 32 such as a keyboard, a mouse, a digital image input unit such as a scanner, and/or other user interface device to the bus 12), a printer 34 and a display adapter 36 (for connecting the bus 12 to a display device 38). The invention could be implemented using the structure shown in FIG. 2A by including the inventive method within a computer program stored on the storage device 20. A query design pattern could be entered into the system through the scanner 32. Such a computer program would act on a stored grouping of image designs supplied from a database 40 through the interface adapter 18 or from a remote database through the network connection provided by the communication adapter 24. The system would then automatically implement the pattern search and retrieval process and produce the desired digital image output on the display 38, or the printer 34 or communicate the image output through the connection provided by the communication adapter 24.

In a web based environment following a client—server model as shown in FIG. 2B, the system 8 shown in FIG. 2A would correspond to a client computer 8', and its communication adapter 24 would establish a network connection 42 to a server computer 44 over an internet service connection. A remote database 46 either resident on the server computer 44 or accessible from the server computer 44 would contain the database of patterns. In typical world wide web operation, the client computer 8' would run a web browser (e.g., stored locally in RAM 14) that would establish the internet connection via conventional HTTP protocol to a web server program at the remote server computer site; HTML forms-based interchange would then be established between the server computer 44 and the client computer 8' to access the database 46.

Figure 3:
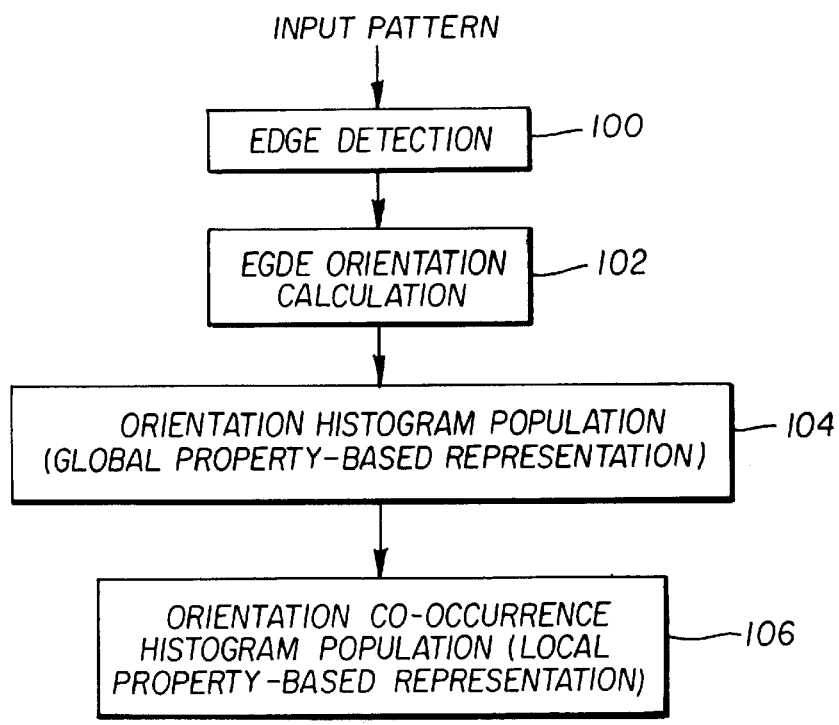
FIG. 3 is a chart of the pattern feature extraction and representation component shown in FIG. 1.
Figure 4:
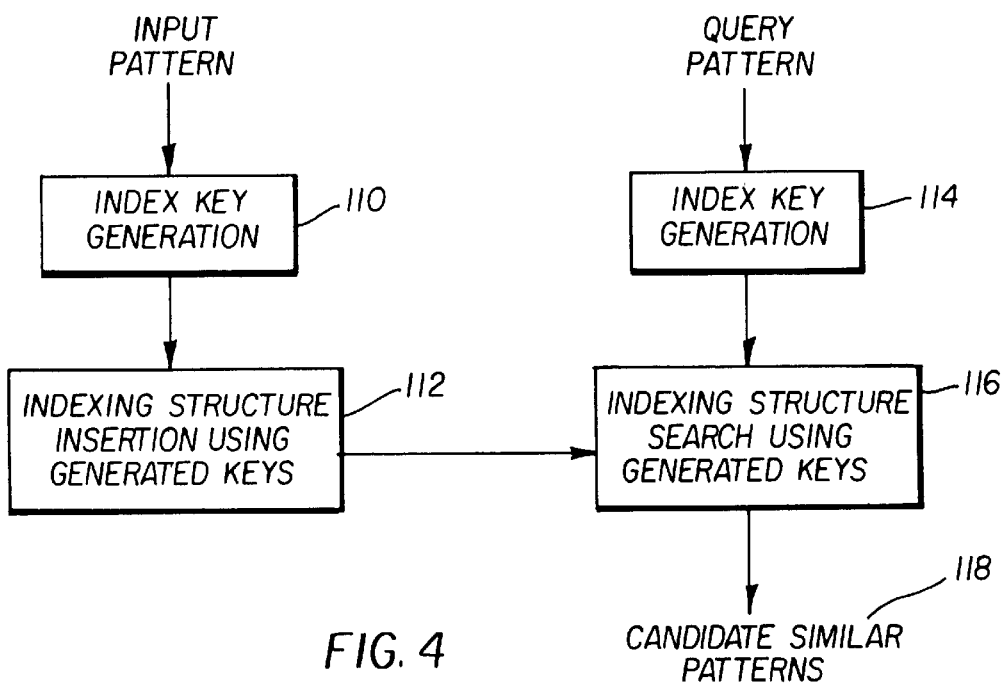
FIG. 4 is a chart of the database organization and search component shown in FIG. 1.
Figure 5:
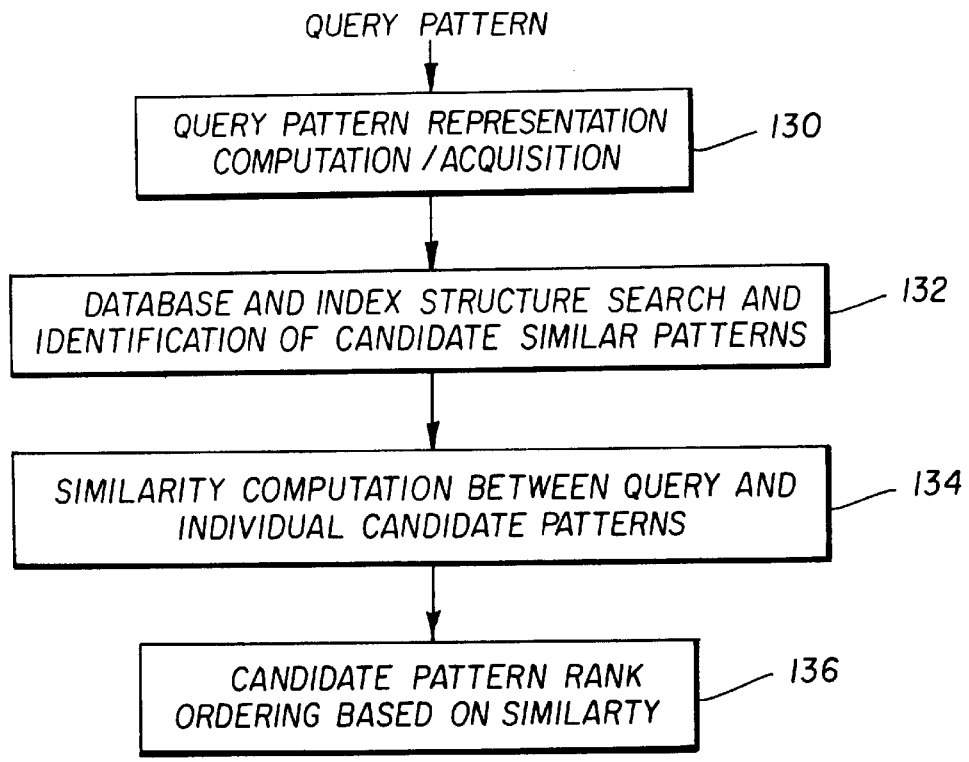
FIG. 5 is a chart of the similar pattern identification and ranking component shown in FIG. 1.

Referring now in particular to FIGS. 3, 4 and 5 the details of each component are as follows.

Figure 6:
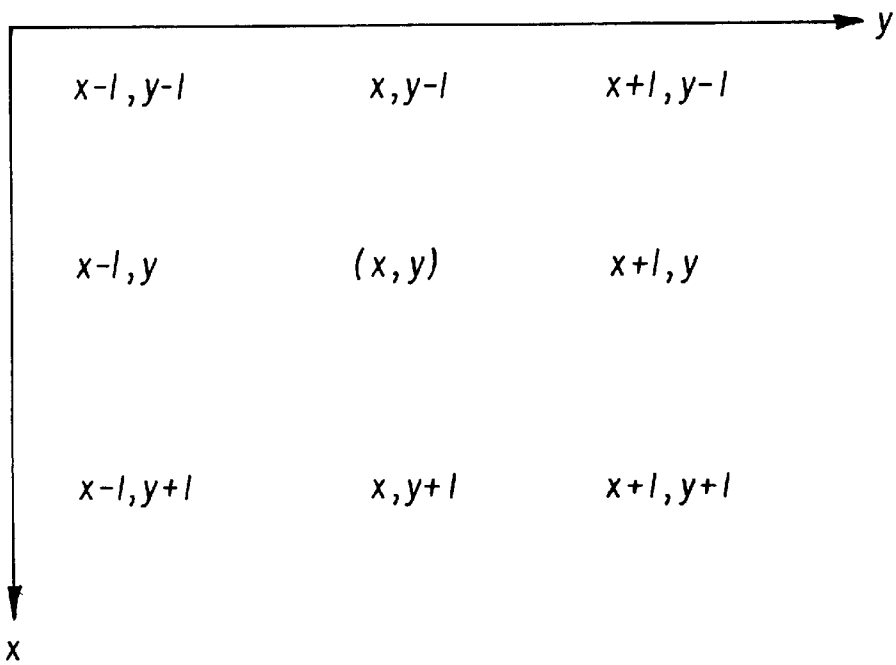
FIG. 6 is a diagram of a window centered at pixel location [x,y].

Pattern Representation:

For each digital pattern in the database 40 (or 46), a representation is automatically extracted by processing the digital image of the pattern to be stored in the database. Since the contours or edges that form a pattern are invariant to color changes, the preferred implementation represents a digital pattern by the properties of it edges. Therefore, first the color edges are detected. Any of the several available edge detection techniques can be used to automatically detect the edges. In the preferred implementation any one of the following options can be selected for the edge detection. Consider a 3-channel colored digital pattern. First the inter-pixel color change for the three color channels is computed by passing a window at location [x,y], as shown in FIG. 6, over the digital image of the input design. Referring to the flow chart in FIG. 3, for a RGB color pattern image, the change in color value is computed in a step 100 as follows for a pixel at location [x,y]:

$DR_x$=R[x−1,y−1]+R[x−1,y]+R[x−1,y+1]−R[x+1,y−1]−R[x+1,y]−R[x+1,y+1]

$DG_x$=G[x−1,y−1]+G[x−1,y]+G[x−1,y+1]−G[x+1,y−1]−G[x+1,y]−G[x+1,y+1]

$DB_x$=B[x−1,y−1]+B[x−1,y]+B[x−1,y+1]−B[x+1,y−1]−B[x+1,y]−B[x+1,y+1]

$DR_y$=R[x−1,y−1]+R[x,y−1]+R[x+1,y−1]−R[x−1,y+1]−R[x,y+1]−R[x+1,y+1]

$DG_y$=G[x−1,y−1]+G[x,y−1]+G[x+1,y−1]−G[x−1,y+1]−G[x,y+1]−G[x+1,y+1]

$DR_y$=B[x−1,y−1]+B[x,y−1]+B[x+1,y−1]−B[x−1,y+1]−B[x,y+1]−B[x+1,y+1]

Then the pixel at location [x,y] is considered an edge using one of the following options:

Option 1: If maximum of {$DR_x,DR_y,DG_x,DG_y,DB_x,DB_y$} exceeds a specified threshold.

Option 2: If $$\sqrt{[(DR_x + DR_y)^2 + (DG_x + DG_y)^2 + (DB_x + DB_y)^2]}$$

exceeds a specified threshold.

Option 3: If D=maximum of {$DR_x+DR_y$, $DG_x+DG_y$, $DB_x+DB_y$} exceeds a specified threshold.

Note that a similar method can be used for digital patterns in other multi-channel color spaces. Further note that any color edge detection method can be used to detect edges.

After the pixel at location [x,y] is determined to be an edge pixel, the edge property at that location must then be calculated. The edge property being calculated in a step 102 is the edge orientation/direction at that particular location. Edge orientation/direction is calculated using the following:

$$\theta = \tan^{-1}\frac{D_y}{D_x} \quad (1)$$

where $D_y$ and $D_x$ can be calculated using one of the following options:

Option 1:

$D_x=w_R DR_x+w_G DG_x+w_B DB_x$ $D_y=w_R DR_y+w_G DG_y+w_B DB_y$ where $DR_x$, $DR_y$, $DG_x$, $DG_y$, $DB_x$, $DG_y$ are as defined above, and $w_R$, $w_G$, and $w_B$ are the relative weights associated with the changes in the red, green, and blue color channels, respectively. In this option, the changes in the x and y direction are calculated as the weighted sum of the changes in each color plane.

Option 2:

$$D = \begin{cases} DR & \text{if } FR = \max(FR, FG, FB) \\ DG & \text{if } FG = \max(FR, FG, FB) \\ DB & \text{if } FB = \max(FR, FG, FB) \end{cases}$$

where $$D = \begin{bmatrix} D_x \\ D_y \end{bmatrix}; \quad DR = \begin{bmatrix} DR_x \\ DR_y \end{bmatrix}, \quad DG = \begin{bmatrix} DG_x \\ DG_y \end{bmatrix}, \quad DB = \begin{bmatrix} DB_x \\ DB_y \end{bmatrix}$$

Those skilled in the art would recognize that any variation of the above two options is possible for the calculation of edge orientation/direction.

After the edge properties at all edge locations are calculated, the digital pattern is represented in a histogram population in terms of these edge properties. There are two options available in the preferred system for the representation of a digital pattern in terms of its edge properties:

1. Global property based representation

Figure 7:
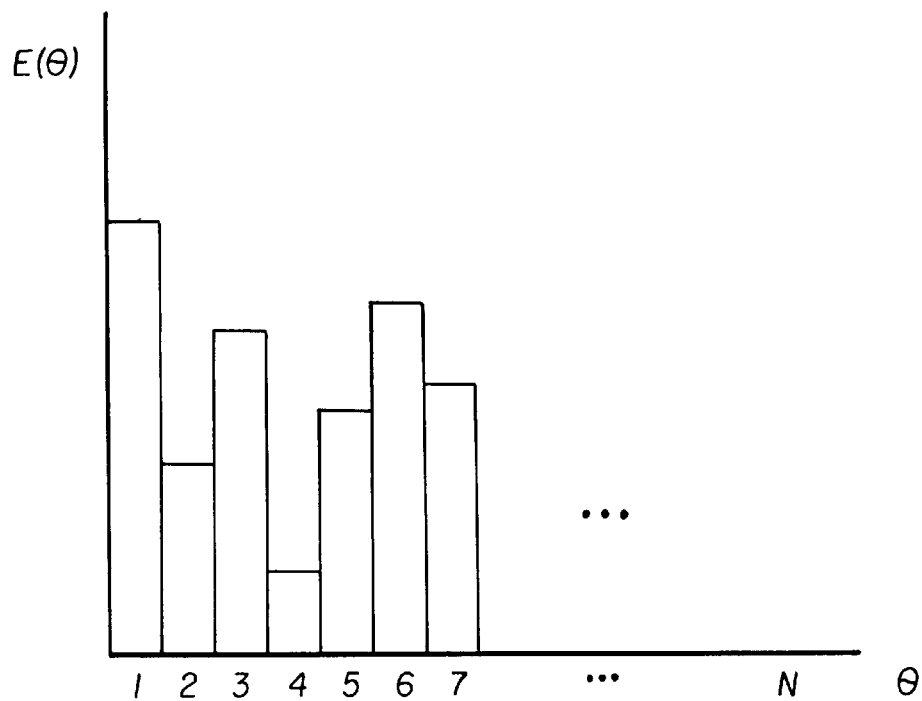
FIG. 7 is an example of a histogram showing relative frequency of occurrence of edge orientations.

In this option, as expressed in a step 104, a digital pattern is represented by the global properties of edges or contours of the pattern. In this preferred implementation, a pattern is represented in a histogram population such as shown in FIG. 7 by the distribution of edge directions or orientations in the pattern. In simple terms, for a total number of N distinct possible orientation values, a pattern is represented by a function E[θ], θ=0, . . . N−1, where θ denotes the edge orientation generated by the edge orientation equation (1) and E[θ] denote the probability or relative frequency of occurrence of an edge with orientation θ. In the preferred embodiment the values of E[θ] are normalized so that the sum of all values for a pattern is 1; in addition, each integer value of θ represents a grouping of angles, e.g., N=1 represents orientation angles of 0–10°, N=2 represents orientation angles of 11°–20°, N=3 represents 21°–30°, and so on.

2. Local property based representation

Figure 8:
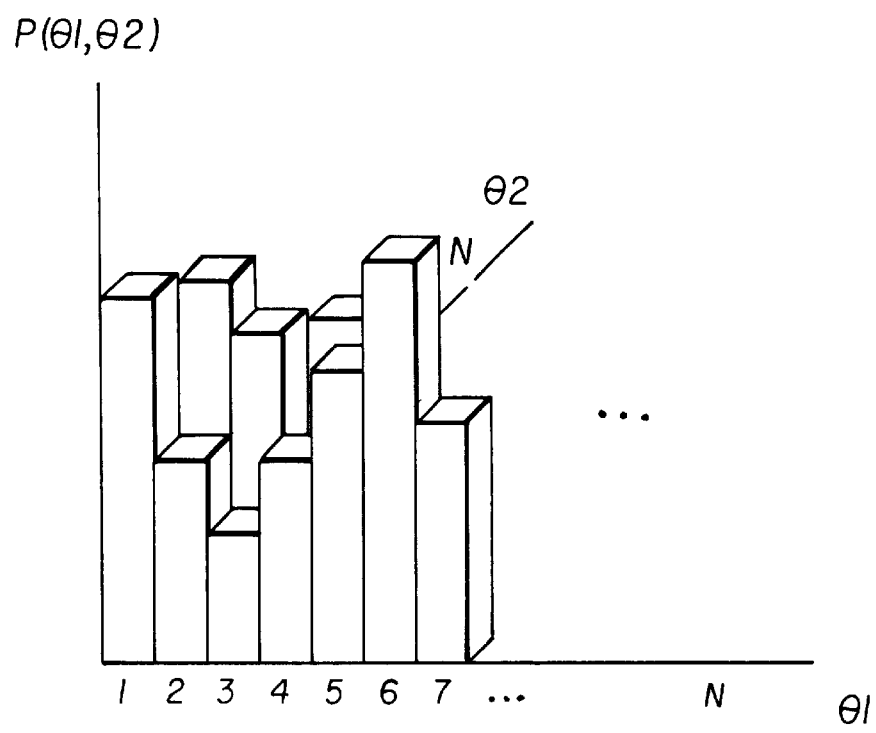
FIG. 8 is an example of a co-occurrence histogram showing relative frequency of occurrence of an edge with an given orientation neighboring an edge with another orientation.

In this option, as expressed in step 106, a digital pattern is representation by the local properties of detected edge or contour points. In the preferred implementation, a pattern is represented in a histogram population by the distribution of edge orientations for co-occurring edge points, such as shown in FIG. 8. In simple terms, for a total number of N distinct possible orientation values, a pattern is represented by a function P[θ1, θ2], θ1=0, . . . N−1, θ2=0, . . . N−1 and P[θ1, θ2] denotes the probability or relative frequency that an edge with the orientation θ1 neighbors an edge with the orientation θ2. As shown in FIG. 8, the orientation co-occurrence histogram is a three-dimensional representation indexed by orientation between co-occurring pixels which depicts the spatial correlation of orientation. This representation approach captures the local structure properties of a pattern. In the preferred embodiment the values of P[θ1, θ2] are normalized so that the sum of all values for a pattern is 1.

Those skilled in art would recognize that other variations of the above two options are possible. Each digital pattern and all, or a dominant portion of, the associated representations E[θ], P[θ1, θ2] are stored in the database. In the preferred implementation, the value of N is selected to be 36. Pattern Database Organization and Search: For a small database, the representation of the query pattern is compared against the representation of each of the patterns in the database. A pattern whose similarity with the query patterns exceeds a specified threshold is selected as a similar pattern. The selected similar patterns are ranked in decreasing order of their similarity with the query pattern.

For a large database of patterns, an option exists as shown in FIG. 4 to organize the pattern representations in an efficient index structure. The purpose of the index structure is to facilitate efficient search of the database for similar patterns. Given a query pattern representation, the index structure is searched first to identify candidate similar patterns, so that only those candidate patterns need to be further examined using more detailed similarity comparison techniques.

Index structures are constructed from patterns and their associated representations. However, due to the high dimensionality of typical pattern representations, typically, not the entire representation is entered into the index structure. Usually, lower-dimensional data, called index keys, are generated from the representations, and are used for indexing. The keys of similar patterns typically cluster together in the index structure. When a query is posed, those patterns whose keys fall within the same cluster in the index structure as the keys of the query pattern will be considered as candidate similar patterns.

In the present implementation, corresponding to the two options for pattern representation, there are two options for generating index keys. For the global edge property based representation, the set of the first K most dominant orientations (those orientations having the highest relative frequency of occurrence) of a pattern representation is used as the key for the pattern. In case of ties (i.e. two orientations having the same relative frequency of occurrence), all possible combinations of keys are created. For example, if K=3, and the first and second most dominant orientation are 10 degrees and 50 degrees, and there is a tie for the third most dominant orientation between 30 degrees and 70 degrees, then two keys will be generated; {10, 50, 30}, and {10, 50, 70}. In the preferred implementation, K has to be less than or equal to 6. For the local edge property based representation option, the set of T most dominant edge orientation pairs is selected as the key for a pattern. The ties are resolved by creating all possible keys in a similar manner as described above. In the preferred implementation, T is required to be less than or equal to 3.

Referring now to FIG. 4, during database organization, the index keys are generated as above indicated in step 110 of index key generation for the patterns in the database. During pattern registration or organization, as shown in step 112, the keys of each pattern in the database are inserted into the index structure. In the index structure, the keys are organized in an efficient manner to facilitate later search. Any multidimensional index structure can be used for organizing the keys. In the present implementation, the keys are organized in an R-tree. Each leaf node of the R-tree index contains a key X, and a link referring to a list of patterns whose representation would generate X as one of the keys. Each pattern representation further refers to the digital image of the pattern. During pattern search or query, given a query pattern representation, first all its keys are generated in step 114. For each key of the query pattern, the index structure is searched in step 116. The set of patterns whose keys occupy the leaf node where a search terminates in the index structure is added in step 118 to the set of candidate similar patterns. After searching the index for every key generated by the query pattern, we obtain the final set of candidates. This set of candidates is further processed using more detailed methods to identify the similar patterns and to rank them in the decreasing order of their similarity with the query pattern, as described in the following section.

Similar Pattern Identification and Ranking: As shown in FIG. 5, each of the representations of a candidate pattern c is compared with the representations of the query pattern q to compute their similarity S(c,q). The pattern identification and ranking begins in step 130 with the representation of the query design, as described in relation to step 114 of FIG. 4. Then the database of patterns is searched in step 132 as described in relation to steps 116 and 118 in FIG. 4. Similarity is evaluated in step 134 according to the following metrics, any one of which can be used in the present implementation:

$$S(c, q) = \sum_{z=0,L-1} \min(R_c[z], R_q[z]) \qquad (a)$$

$$S(c, q) = \sum_{z=0,L-1} 1 - |R_c[z] - R_q[z]| \qquad (b)$$

$$S(c, q) = \frac{1}{L-1} \sum_{z=0,L-1} \frac{\min(R_c[z], R_q[z])}{\max(R_c[z], R_q[z])} \qquad (c)$$

Where $R_c[.]$ and $R_q[.]$ denote the values of a component of the patterns of candidate pattern c and query pattern q, respectively; L is the total number of components in the representation. L=N for the global property based pattern representation and L=$N^2$ for the local property based pattern representation. For example, in metric (a) the representation values $R_c$ and $R_q$ for each orientation component are compared and the minimum-values thereof are summed for the respective patterns for both global properties and local properties. The value of S(c,q) is in range [0, 1], where 1 indicates self identity. If the S(c,q) exceeds a specified threshold, the candidate pattern c is considered similar to query pattern q and is added in step 136 to the set of similar patterns in the sorted order. Otherwise, the candidate is discarded. Note that other similarity metrics can also be employed within the scope of this invention.

The aforementioned set of similar patterns in their sorted order represent different versions similar to the selected query pattern. In applications such as fabric selection for furniture or clothing, wallpapers, floor mats, rugs, window treatments, and tile selection in an interior decoration application, it is important that different colored versions of a selected pattern may be retrieved and reviewed. Such a review requires identification and retrieval of the set of patterns similar to a selected pattern, in which each digital pattern is represented in the database in terms of color invariant properties for purposes of search and retrieval. This invention provides such a system for organizing a database of patterns using an edge property based representation for each pattern.

Figure 9:
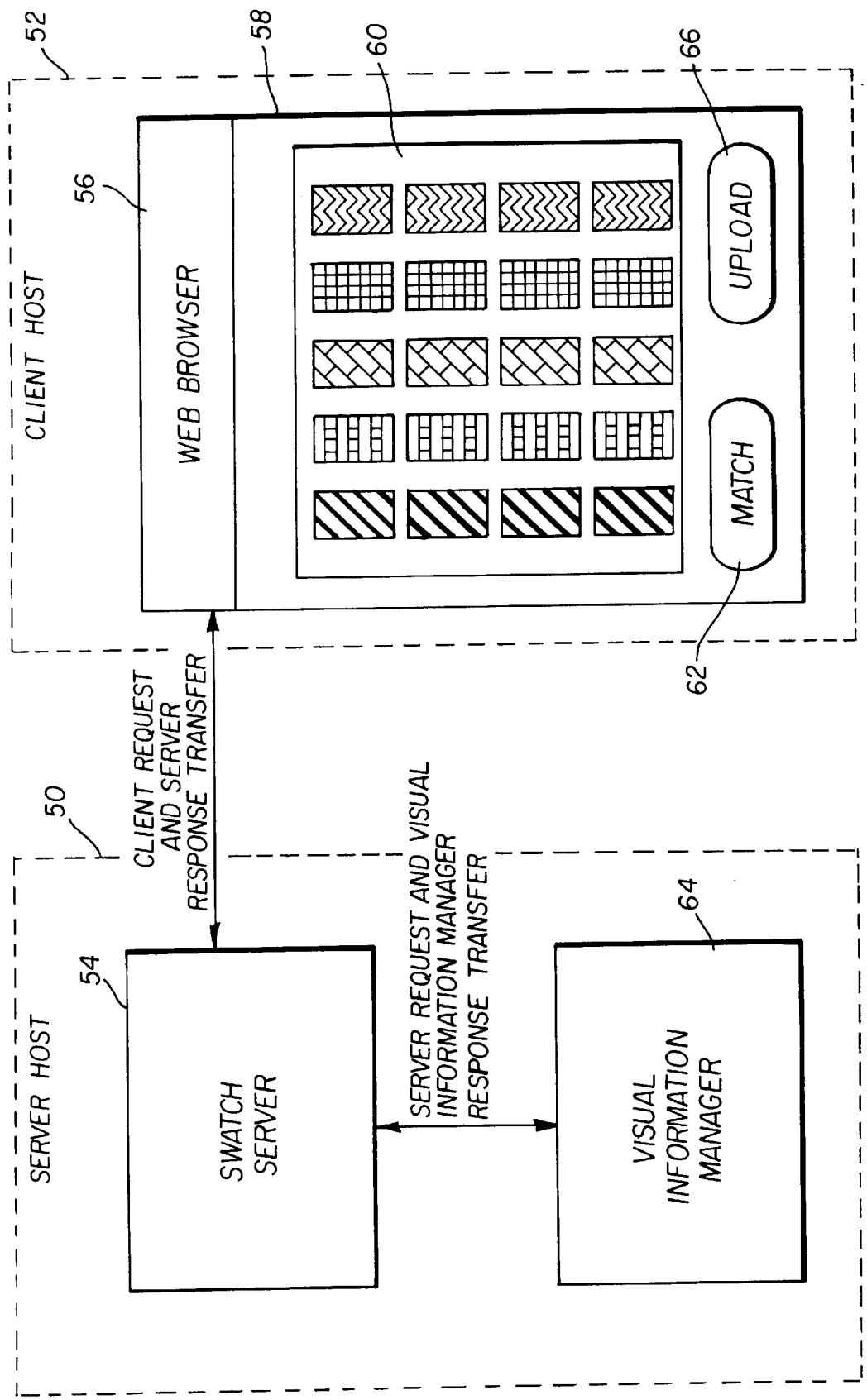
FIG. 9 is an illustration of a web-based pattern registration and searching architecture for on-line pattern search and selection.

In a different aspect of the invention, a web-based pattern registration and searching architecture enables on-line pattern search and selection utilizing a variety of pattern representations and similarity techniques, including the edge property based system described above. Further details of a typical client—server setting for a web-based architecture are shown in FIG. 9, which shows a server host 50 interconnected via a network (e.g., the Internet) with a client host 52. Following an appropriate establishment of communication between the client host and the server host, a swatch server 54 is run on the server host 50, and a web browser 56 running on the client host 52 causes display of a "swatches" web page generated by an applet 58. The client application functionality is incorporated into the applet, which is loaded and run in the web browser 56 and displayed via the applet onto the web browser 56. A user at the client host 52 selects a particular pattern in a swatch grid 60 and clicks on a match button 62, which causes the applet 58 to instruct the web browser 56 to execute a request to the swatch server 54 to find patterns matching the selected pattern. The swatch server initiates communications with a visual information manager 64, which contains a database of patterns, and which may be indexed according to the invention or by any other conventional indexing architecture. The pattern representation algorithm and the searching methodology, such as the algorithm and methodology disclosed herein, is included in the visual information manager 64. The visual information manager 64 performs the appropriate functions and returns the appropriate response, namely, the list of similar patterns, to the swatch server 54, which in turn causes the swatch server to return the response to the applet 58. The applet generates the final web page to be displayed in the web browser 56. A user at the client host 52 can elect to upload a particular swatch into the database of patterns residing in the visual information manager by clicking the upload button 66; this pattern would then be uploaded from a storage device accessible to the user, and may have been provided from a variety of sources, including the scanning of a swatch by the input scanner 32 shown in FIG. 2. The request is communicated from the web browser 56 to the swatch server 54 and in turn to the visual information manager 64, where the representation for the uploaded pattern is calculated and the uploaded pattern and all its corresponding information are properly stored into the database of patterns as described herein. While the web-based architecture described above generates web pages via applets, it should be understood that other means of web page generation, such as via CGI script, can also be utilized in accordance with the invention.

While the pattern representation algorithm, and the indexing and searching methodology, is preferably as described herein, it should be understood that other algorithms and methodologies maybe incorporated in practice of the web-based pattern registration and searching architecture in accordance with the invention.

The invention has been described with reference to a preferred embodiment. However, it will be appreciated that variations and modifications can be effected by a person of ordinary skill in the art without departing from the scope of the invention.

PARTS LIST 2 pattern representation
4 pattern database organization and search
6 similar pattern identification and ranking
8 computer system
8' client computer
10 CPU
12 system bus
14 RAM
16 ROM
18 I/O adapter
20 disk unit
22 tape drive
24 communication adapter
26 user interface adapter
28 keyboard
30 mouse
32 scanner
34 printer
36 display adapter
38 display device
40 database
42 network connection
44 server computer
46 remote database
50 server host
52 client host
54 swatch server
56 web browser
58 applet
60 swatch grid
62 match button
64 visual information manager
66 upload button
100–136 steps

What is claimed is:

1. A method for retrieving digital patterns similar to a query pattern selected by a user, said method comprising the steps of:
   (a) generating representations of each digital pattern in terms of one or more color invariant properties, wherein said step (a) of generating representations of each digital pattern in terms of color invariant properties includes generating representations of each digital pattern in terms of its edge properties;
   (b) storing and organizing the patterns and their representations in a database; and
   (c) searching the database by reference to the representations to identify and retrieve patterns similar to the query pattern.

2. The method as claimed in claim 1 wherein step (b) of storing and organizing the patterns and their representations in the database includes organizing the representations in an index structure.

3. The method as claimed in claim 2 wherein the step (c) of searching the database includes:
   (a) searching the index structure to identify a set of candidate patterns; and
   (b) analyzing the set of candidate patterns to identify the patterns similar to the query pattern.

4. The method as claimed in claim 1 further including the step of ranking the retrieved patterns in a sorted order of their similarity with respect to the query pattern.

5. The method as claimed in claim 1 wherein each digital pattern is represented in terms of edge orientations.

6. The method as claimed in claim 5 wherein each digital pattern is represented in terms of relative frequency of occurrence of at least some of the possible edge orientations.

7. The method as claimed in claim 6 wherein the relative frequency of occurrence of at least some of the possible edge orientations includes distribution of edge orientations for co-occurring edges.

8. The method as claimed in claim 1 wherein the step (c) of identifying patterns similar to the query pattern includes computing the similarity of the query pattern and a candidate pattern based on the similarity of their edge orientation frequency representations.

9. The method as claimed in claim 1 wherein the step (c) of identifying patterns similar to the query pattern includes computing the similarity of the query pattern and a candidate pattern based on the similarity of their edge orientation co-occurrence frequency representations.

10. A web-based program tool that assists in the review and selection of patterns by utilizing the method as claimed in claim 1 to automatically identify and retrieve patterns similar to a selected pattern.

11. A web-based program tool that assists in the review and selection of fabric for clothing or furniture by utilizing the method as claimed in claim 1 to automatically identify and retrieve clothing or furniture patterns similar to a selected pattern.

12. A web-based interior decoration program tool that assists in the review and selection of wallpaper, tile, floor treatment or window treatment by utilizing the method as claimed in claim 1 to automatically identify and retrieve wallpaper, tile, floor treatment or window treatment patterns similar to a selected pattern.

13. A system for retrieving digital patterns similar to a query pattern selected by a user, said system comprising:
  (a) a database of digital patterns;
  (b) a processing stage for generating representations of each digital pattern in terms of one or more color invariant properties and organizing the patterns and their representations in a database organization, wherein said processing stage generates representations of each digital pattern in terms of one or more edge properties of each pattern;
  (c) a provision for storing the patterns and their representations in the database; and
  (d) a searching stage that searches the database by reference to the representations to identify and retrieve patterns similar to the query pattern.

14. The system as claimed in claim 13 wherein the patterns and their representations are organized in an index structure and the searching stage includes a searching algorithm for searching the index structure to identify a set of candidate patterns and analyze the set of candidate patterns to identify the patterns similar to the query pattern.

15. The system as claimed in claim 13 wherein the search stage ranks the retrieved patterns in a sorted order of their similarity with respect to the query pattern.

16. The system as claimed in claim 13 wherein the processing stage generates representations of each pattern in terms of edge orientations.

17. The system as claimed in claim 16 wherein the processing stage generates representations of each pattern in terms of relative frequency of occurrence of at least some of the possible edge orientations.

18. The system as claimed in claim 17 wherein the relative frequency of occurrence of at least some of the possible edge orientations includes distribution of edge orientations for co-occurring edges.

19. A computer program product for retrieving digital patterns similar to a query pattern comprising: a computer readable storage medium having a computer program stored thereon for performing the steps of:
  (a) generating representations of each digital pattern in terms of one or more color invariant properties, wherein said step (a) of generating representations of each digital pattern in terms of color invariant properties includes generating representations of each digital pattern in terms of its edgers properties;
  (b) storing and organizing the patterns and their representations in a database; and
  (c) searching the database by reference to the representations to identify and retrieve patterns similar to the query pattern.

20. The computer program product as claimed in claim 19 wherein step (b) of storing and organizing the patterns and their representations in the database includes organizing the representations in an index structure.

21. The computer program product as claimed in claim 20 wherein the step (c) of searching the database includes:
  (a) searching the index structure to identify a set of candidate patterns; and
  (b) analyzing the set of candidate patterns to identify the patterns similar to the query pattern.

22. The computer program product as claimed in claim 19 further including the step of ranking the retrieved patterns in a sorted order of their similarity with respect to the query pattern.

23. The computer program product as claimed in claim 19 wherein each digital pattern is represented in terms of edge orientations.

24. The computer program product as claimed in claim 23 wherein each digital pattern is represented in terms of relative frequency of occurrence of at least some of the possible edge orientations.

25. The computer program product as claimed in claim 23 wherein the relative frequency of occurrence of at least some of the possible edge orientations includes distribution of edge orientations for co-occurring edges.

* * * * *